United States Patent [19]

Kobayashi et al.

[11] Patent Number: 5,115,255

[45] Date of Patent: May 19, 1992

[54] THERMAL PRINTER SUITABLE FOR BOTH THERMAL TRANSFER AND HEAT SENSITIVE RECORDING

[75] Inventors: Makoto Kobayashi; Takehiro Yoshida, both of Tokyo; Satoshi Wada, Kawasaki; Hisao Terajima, Yokohama; Takeshi Ono, Yokohama; Minoru Yokoyama, Yokohama; Takashi Awai, Yokohama; Akihiro Tomoda, Yokohama; Yasushi Ishida, Tokyo, all of Japan

[73] Assignee: Canon Kabushiki Kaisha, Tokyo, Japan

[21] Appl. No.: 430,179

[22] Filed: Nov. 1, 1989

[30] Foreign Application Priority Data

Nov. 1, 1988 [JP] Japan .............................. 63-274374

[51] Int. Cl.⁵ ............................................. G01D 15/10
[52] U.S. Cl. ................................................. 346/76 PH
[58] Field of Search .................................... 346/76 PH

[56] References Cited

U.S. PATENT DOCUMENTS

| | | | |
|---|---|---|---|
| 4,404,568 | 9/1983 | Kikuchi et al. | 346/76 PH |
| 4,516,137 | 5/1985 | Yasui | 346/76 PH |
| 4,675,698 | 6/1987 | Tsutsumi | 346/76 PH |
| 4,737,860 | 4/1988 | Ono et al. | 358/298 |
| 4,814,789 | 3/1989 | Ono | 346/76 PH |
| 4,875,056 | 10/1989 | Ono | 346/76 PH |

FOREIGN PATENT DOCUMENTS

59-59470 4/1984 Japan .

OTHER PUBLICATIONS

Search Report for Eur. Pat. App. No. 89120212.9.

*Primary Examiner*—Benjamin R. Fuller
*Assistant Examiner*—Nancy Le
*Attorney, Agent, or Firm*—Fitzpatrick, Cella, Harper & Scinto

[57] ABSTRACT

The present invention provides a thermal printer which can perform both heat-sensitive recording and heat-transfer recording and comprises a recording medium loading portion for removably receiving a recording medium for the heat-sensitive recording operation and a recording medium for the heat-transfer recording operation; an ink sheet loading portion for removably receiving an ink sheet used with the heat-transfer recording operation; a recording means for recording an image on the recording medium; and a control means for energizing the recording means to heat a predetermined number of dots when the image is recorded on the recording medium for the heat-transfer recording operation by means of the recording means and for energizing the recording means to heat a number of dots larger than the predetermined number of dots when the image is recorded on the recording medium for the heat-sensitive recording operation. The present invention also provides a facsimile system comprising the above-mentioned thermal printer, a reading means for reading an original image, and a transmission/reception means for transmitting and receiving an image signal.

8 Claims, 7 Drawing Sheets

THERMAL PRINTER SUITABLE FOR BOTH THERMAL TRANSFER AND HEAT SENSITIVE RECORDING

BACKGROUND OF THE INVENTION

1. Field of the Invention

The present invention relates to a thermal printer which records an image on a heat-sensitive recording medium by heating the latter, and a facsimile system which records an image on a recording medium by transferring ink from an ink sheet to the recording medium.

2. Related Background Art

Generally, in a heat-sensitive printer which records an image on a recording medium such as heat-sensitive paper, and in a heat transfer printer which records an image on a recording medium such as plain paper by transferring ink from an ink sheet to the recording medium, the recording operation is performed by heating a thermal head. In this connection, a thermal printer which can perform not only heat-transfer image recording on the plain paper but also heat-sensitive recording on the heat-sensitive paper by means of a single printer by merely changing the recording media and mounting or dismounting the ink sheet has been proposed. Conventionally, in such a thermal printer, the heat control regarding the thermal head was not altered at all when the heat-sensitive recording mode was changed to the heat-transfer recording mode or vice versa, or the time for current supply to the thermal head was merely altered when the heat-sensitive recording mode was changed to the heat-transfer recording mode or vice versa.

On the other hand, conventionally, in the heat-transfer printer, the use of an ink sheet by which multiple image recordings can be repeated by n times (referred to hereinafter as "multi-print ink sheet") has been known. By using such a multi-print ink sheet, when the recording length of L is continuously recorded, a total length of movement of the ink sheet to be fed after each of the images has been recorded or during the recording of the images can be shortened smaller than the length L (L/n : n>1). In this way, the efficiency of the use of the ink sheet can be increased by n times in comparison with the conventional ink sheet, thus reducing the running cost of the heat-transfer printer. The printing method using the multi-print ink sheet will be referred to hereinafter as "multi-print".

Heretofore, in a thermal printer capable of performing the multi-print, recording an apparatus which can record good images both on plain paper and heat-sensitive paper has been required.

SUMMARY OF THE INVENTION

An object of the present invention is to provide a thermal printer and a facsimile system which can record a sharp or fine image on a recording medium.

Another object of the present invention is to provide a thermal printer and a facsimile system which can reduce recording time.

A further object of the present invention is to provide a thermal printer and a facsimile system which can effectively perform both heat-sensitive recording operations and heat-transfer recording operations.

A still further object of the present invention is to provide a thermal printer and a facsimile system which can reduce recording time when the heat-sensitive recording medium is used, by changing the number of dots of a thermal head to be heated between the heat-sensitive recording operation using a heat-sensitive recording medium and the heat-transfer recording operation/using an ink sheet.

Yet another object of the present invention is to provide a thermal printer and a facsimile system which can record a sharp image on a recording medium both in heat-transfer recording using an ink sheet for a multi-print and in heat-sensitive recording.

DETAILED DESCRIPTION OF THE PREFERRED EMBODIMENTS

A thermal printer according to a preferred embodiment of the present invention which will be described hereinbelow can record an image on a recording medium by heating a predetermined number of dots in a thermal head, when the recording operation is to be performed on a recording medium (for example, a plain paper, plastic sheet, cloth sheet and the like). Further, the thermal printer can record the image on a heat-sensitive recording medium (for example, a heat-sensitive paper) by heating a number of dots greater than the predetermined number, when the recording operation on the heat-sensitive recording medium is performed.

Further, a facsimile system according to a preferred embodiment of the present invention can record an image on the recording medium by heating a predetermined number of dots in the thermal head on the basis of an image signal from an image input means or a transmission/reception means, when the recording operation on the recording medium is commanded. Further, the facsimile system can record the image on the heat-sensitive recording medium by heating a number of dots of the thermal head which is more than the predetermined number on the basis of an image signal from the image input means or the transmission/reception means, when the recording operation on the heat-sensitive recording medium is commanded.

The present invention will now be explained in connection with embodiments thereof with reference to the accompanying drawings.

First of all, the facsimile system will be explained with reference to FIGS. 1 to 4.

Figure 1:
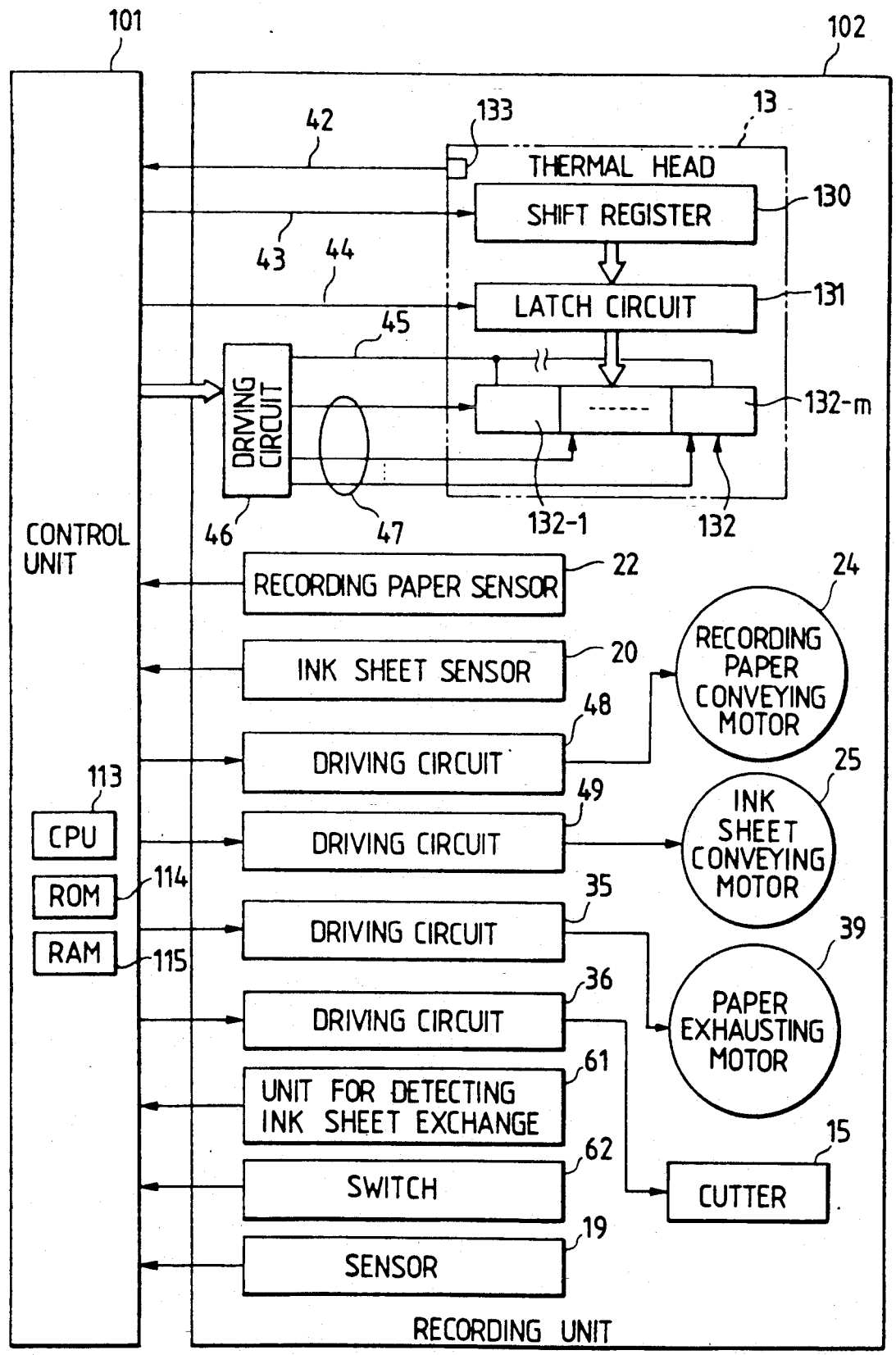
FIG. 1 is a block diagram showing an electric connection between a control unit and a recording unit of a facsimile system according to a preferred embodiment of the present invention.
Figure 2:
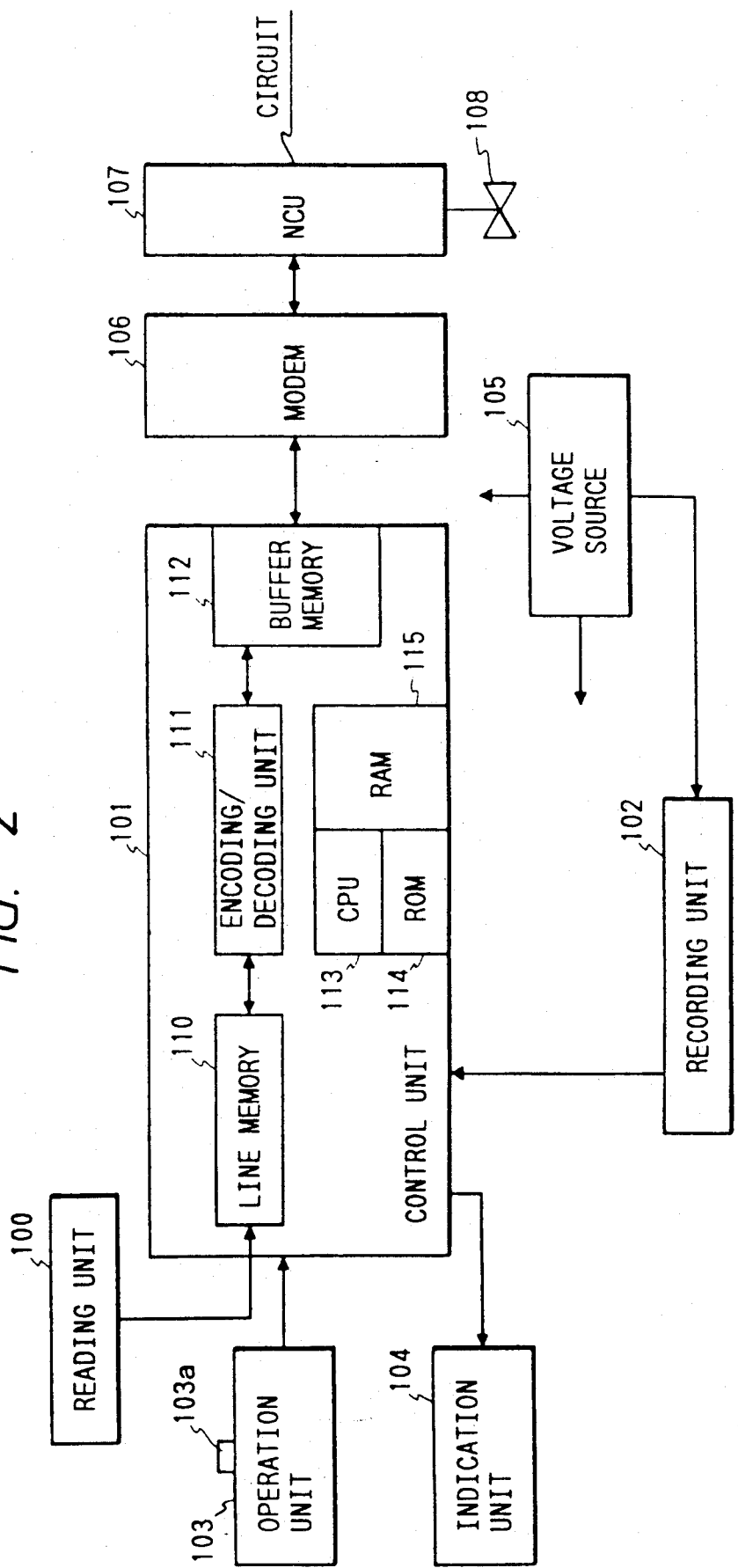
FIG. 2 is a block diagram showing a schematic construction of the facsimile system according to the embodiment of FIG. 1.
Figure 3A:
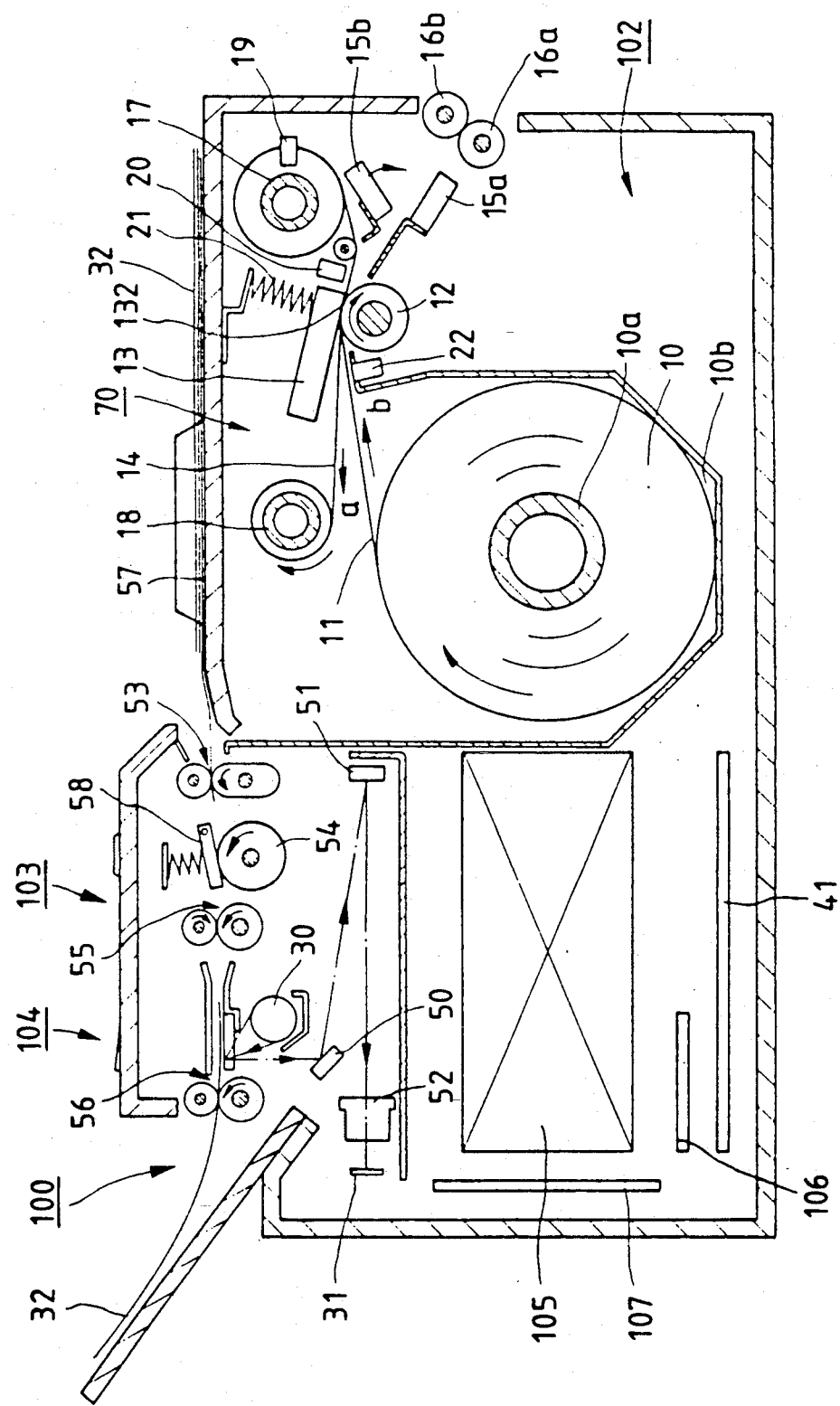
FIG. 3A is an elevational sectional view showing a mechanical portion of the facsimile system according to the embodiment of FIG. 1.
Figure 3B:
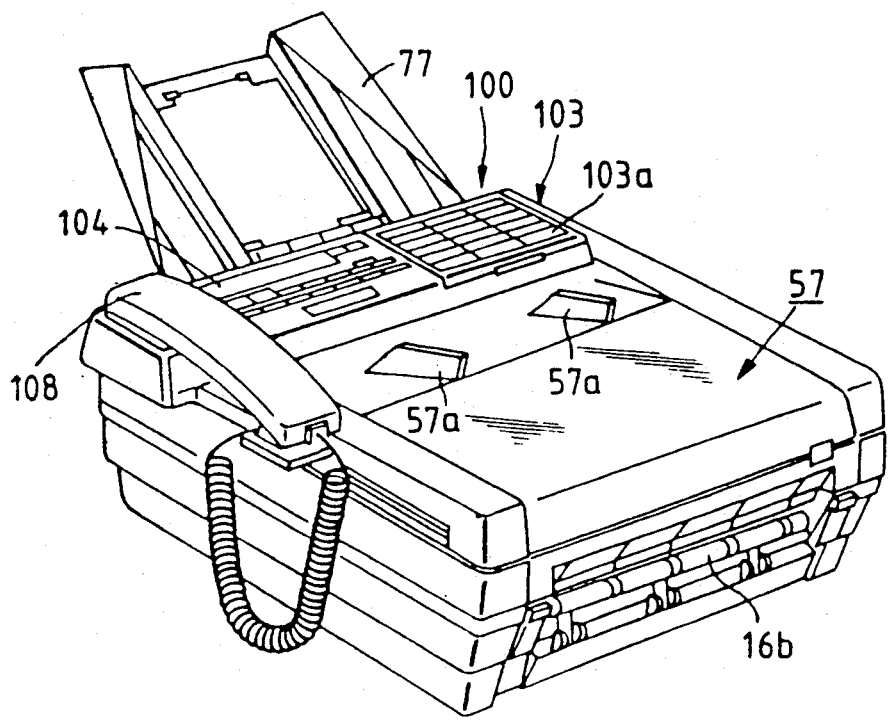
FIG. 3B is a perspective view of the facsimile system of FIG. 3A.
Figure 4:
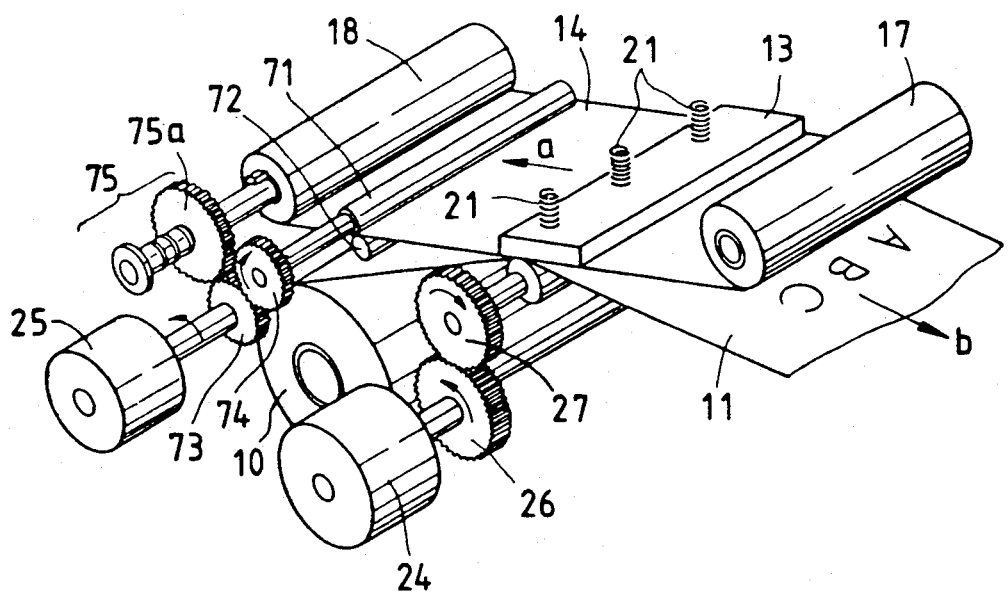
FIG. 4 is a perspective view showing feeding systems for an ink sheet and a recording paper.

FIGS. 1 to 4 show an embodiment of a facsimile system incorporating a thermal printer according to an embodiment of the present invention. In particular, FIG. 1 shows an electric connection between a control unit 101 and a recording unit 102 of the facsimile system. FIG. 2 is a block diagram showing a schematic construction of the facsimile system. FIG. 3A is an elevational sectional view of the facsimile system, FIG. 3B is a perspective view of the facsimile system, and FIG. 4 shows feeding systems for the ink sheet and recording paper.

Here, the construction of the facsimile system will be explained with reference to FIG. 2.

In FIG. 2, a recording unit 100 is provided for reading an original or manuscript photo-electrically and for outputting a digital image signal to the control unit 101, which recording unit 100 includes an original feed motor, CCD image sensor and the like. Next, a construction of the control unit 101 will be explained. The control unit 101 comprises a line memory 110 for storing data of each line of the image data, which line memory is adapted to store the image data for one line from the reading unit 100 during the transmission of the original image and during the copying operation and to store one line data of the received decoded image data during the reception of the image data. By sending the stored data to the recording unit 102, the image is formed. The control unit 101 further comprises an encoding/decoding unit 111 for coding image information to be transmitted by MH codes and the like and for decoding the received coded image data to convert it into the image data, and a buffer memory 112 for storing the coded image data to be transmitted or the received coded image data. These elements 110–112 of the control unit 101 are controlled, for example, by a CPU 113 such as a microprocessor and the like. The control unit 101 further includes a ROM 114 for storing a control program and various data, and a RAM 115 for temporarily storing the various data as a work area for the CPU 113.

The recording unit 102 is provided with a thermal head (on which a plurality of heating elements 132 are arranged along its recordable width), by which the image is recorded on plain paper or on a heat-sensitive paper through the heat-transfer recording operation or the heat-sensitive recording operation. The detailed construction of the thermal head will be described later with reference to FIG. 3. The reference numeral 103 designates an operation unit including various function and command keys such as a transmission start key and the like and input keys for inputting the telephone number, and 103a designates a manual switch for indicating the kind of ink sheets 14 to be used in the heat-transfer recording operation. When the switch 103a is turned OFF, the fact that the multi-print ink sheet (refer to FIG. 8) is mounted on the printer is indicated, whereas, when the switch 103a is turned ON, the fact that a normal one time ink sheet is mounted on the printer is indicated. The reference numeral 104 designates an indicating unit normally arranged adjacent the operation unit 103 and adapted to indicate the conditions of the various functions and devices, and 105 designates a power source (voltage source) for supplying the electric power to the whole facsimile system. Further, the reference numeral 106 designates a MODEM, 107 designates a network control unit (NCU), and 108 designates a telephone.

Next, the construction of the recording unit 102 will be explained with detail in connection with FIG. 3. Incidentally, the same elements as those shown in FIG. 2 are designated by the same reference numerals.

In FIG. 3, the reference numeral 10 designates a paper roll made by winding a recording paper 11 such as plain paper (used in the heat-transfer recording operation) around a core 10a. The paper roll 10 is rotatably housed in the facsimile system in such a manner that the recording paper 11 can be supplied to a thermal head portion 13 in response to the rotation of a platen roller 12 in a direction shown by the arrow. On the other hand, when the heat-sensitive recording operation is desired, the sheet roll 10 is replaced by a sheet roll obtained by winding a heat-sensitive paper, which can be supplied to the thermal head portion 13 in the same manner as the plain paper. Incidentally, the reference numeral 10b designates a sheet roll loading portion for removably receiving the sheet roll. The platen roller 12 feeds the recording sheet 11 in a direction b and cooperates with the heating elements 132 of the thermal head 13 to urge the recording sheet 11 (and the ink sheet 14) against the platen roller by means of the thermal head. After the image has been recorded on the recording paper 11 by selectively heating the heating elements 132 of the thermal head 13, the recording sheet 11 is fed toward a pair of ejector rollers 16 (including rollers 16a, 16b) by the further rotation of the platen roller 12. After the image has been recorded for one page, the recording sheet 11 is cut off into page lengths by means of a cutter 15 (including cutter blades 15a, 15b) and is ejected. Incidentally, in the heat-transfer recording operation, the image is recorded on plain paper by transferring the ink on the ink sheet 14 onto the plain paper, whereas, in heat-sensitive recording, the image is recorded on the heat-sensitive paper by partially heating the latter. The reference numeral 17 designates an ink sheet supply reel on which the ink sheet 14 to be fed is wound, and 18 designates an ink sheet take-up reel which is rotated by an ink sheet feed motor (described later) to wind up the ink sheet in the direction a. Incidentally, the ink sheet supply reel 17 and the take-up reel 18 are removably mounted on an ink sheet loading portion 70 in the facsimile system. Further, the reference numeral 19 designates a sensor for detecting the remaining amount of the ink sheet 14 and/or the feeding speed of the ink sheet 14, and 20 designates an ink sheet sensor for detecting the presence of the ink sheet 14. Incidentally, in the heat-sensitive recording operation, the above-mentioned supply reel 17, take-up reel 18 and the like associated with the ink sheet 14 are normally removed from the facsimile system.

The reference numeral 21 designates a spring for urging the thermal head 13 against the platen roller 12 with the interposition of the recording sheet 11 (and the ink sheet 14), and 22 designates a recording paper sensor for detecting the presence of the recording paper 11.

Next, the construction of the reading unit 100 will be explained.

In FIG. 3A, the reading unit 100 includes a light source 30 for illuminating an original or manuscript 32. The light reflected by the original 32 is sent through an optical system (including mirrors 50, 51 and a lens 52) to a CCD sensor 31, where the light is converted into an electric signal. The original 32 is fed or conveyed synchronously with the reading speed of the original by means of feed rollers 53, 54, 55, 56 driven by an original feeding motor (not shown). Incidentally, the reference numeral 57 designates an original support. A plurality of originals 32 supported on the original support 57 are guided by sliders 57a (FIG. 3B) and are separated one by one through the cooperation of feed roller and a pressure separating member 58 to be fed to the recording portion 100. After reading, the original is ejected onto a tray 177.

The reference numeral 41 designates a control substrate constituting a main part of the control unit 101. By means of this control substrate 41, various control signals are sent to various units or portions of the facsimile system.

FIG. 4 shows the details of the feeding mechanism for the ink sheet 14 and the recording paper 11.

In FIG. 4, the reference numeral 24 designates a recording paper feeding motor for rotatingly driving the platen roller 12 to feed the recording paper 11 in the direction b opposite to the direction a. The reference numeral 25 designates an ink sheet feeding motor for feeding the ink sheet 14 in the direction a. Further, the reference numerals 26, 27 designate transmission gears for transmitting the rotation of the recording paper feeding motor 24 to the platen roller 12, and 28, 29 designate transmission gears for transmitting the rotation of the ink sheet feeding motor 25 to the take-up reel 19.

In this way, in the heat-transfer recording operation, by keeping the feeding direction of the recording paper 11 opposed to the feeding direction of the ink sheet 14, the direction along which the images are successively recorded on the recording paper longitudinally (a direction shown by the arrow a, i.e., a direction opposite to the feeding direction of the recording paper 11) coincides with the feeding direction of the ink sheet 14. Now, when the multiprint ink sheet (including the amount of ink for permitting the plural image recording at the same position or portion) is used as the ink sheet 14, if it is assumed that the feeding speed of the recording paper 11 is VP and the feeding speed of the ink sheet 14 is VI, the relation $VP = -VI$ will be obtained. Here, $-$(minus) indicates the fact that the feeding direction of the recording paper 11 is opposed (reverse) to the feeding direction of the ink sheet 14.

FIG. 1 shows the electric connection between the control unit 101 and the recording unit 102 of the facsimile system according to the illustrated embodiment. Incidentally, the elements which have been shown in other drawings will be designated by the same reference numerals used in such drawings.

The thermal head 13 comprises a line head. The thermal head 13 includes a shift register 130 for inputting the serial recording data for one line and a shift clock 43 from the control unit 101, a latch circuit 131 for latching the data of the shift register 130 on the basis of a latch signal 44, and the aforementioned heating elements 132 comprising heating resisters for one line. The heating elements 132 are divided into m blocks 132-1~132-m and can be energized independently if the multi-print ink sheet is used. Further, a temperature sensor 133 is provided in association with the thermal head 13 to detect the temperature of the thermal head 13. An output signal 42 from the temperature sensor 133 is A/D (analog-to-digital) converted in the control unit 101 and then is sent to the aforementioned CPU 113. Consequently, the CPU 113 detects the temperature of the thermal head 13, and, on the basis of this temperature information, the CPU 113 alters a pulse width of a strobe signal 47 or a driving voltage of the thermal head 13, thereby altering the energy to be applied to the thermal head 13.

Incidentally, the kind of ink sheet 14 being used may be discriminated by manually manipulating a switch 103a of the aforementioned operation unit 103 or may be automatically discriminated by detecting a mark of the like printed on the ink sheet 14. Alternatively, the kind of the ink sheet may be discriminated by detecting a mark or projection formed on a cartridge accommodating the ink sheet 14 therein.

The reference numeral 46 designates a driving circuit for receiving a driving signal for the thermal head 13 from the control unit 101 and for outputting the strobe signal 47 to energize the block or blocks of the heating elements 132 of the thermal head 13. The driving circuit 46 can alter or change the voltage sent to a line 45 for supplying the current to the heating elements 132 of the thermal head 13 to alter the energy to be applied to the thermal head 13, in response to the command from the control unit 101. Further, the driving circuit 46 may alter the number of the blocks or heating elements 132 to be energized at a time in response to the command from the control unit 101, thereby heating the thermal head 13 in correspondence with the data to be recorded.

The reference numeral 36 designates a driving circuit for driving the cutter 15, which driving circuit includes a cutter driving motor and the like. The reference numeral 39 designates an ejector motor for rotatingly driving the ejector rollers 16. The reference numerals 35, 48, 49 designate driver circuits for rotatingly driving the ejector motor 39, recording paper feeding motor 24 and ink sheet feeding motor 25, respectively. Incidentally, in the illustrated embodiment, while these motors 39, 24, 25 comprise stepping motors, these motors are not limited to stepping motors, but may instead by DC motors, for example. Further, the reference numeral 61 designates a unit for detecting ink sheet exchange, which indicates the fact that the ink sheets 14 are exchanged, to the control unit 101 by means of a pulse signal and the like. The reference numeral 62 designates a manual heat-sensitive/heat-transfer change-over switch. For example, this switch 62 is turned ON, the record on the heat-sensitive paper (i.e., the heat-sensitive recording operation) is commanded, whereas, when the switch 62 is turned OFF, the heat-transfer recording operation by the use of the ink sheet 14 is commanded. Incidentally, such command for the heat-sensitive recording operation or the heat-transfer recording operation is not limited to the use of the switch 62, but, for example, the control unit 101 may automatically judge that the heat-sensitive recording operation is commanded, when the fact that the ink sheet 14 is not mounted on the facsimile system is detected by means of the ink sheet sensor 20 or the sensor 19.

Next, the recording operation will be explained with reference to FIGS. 1 to 7.

Figure 5:
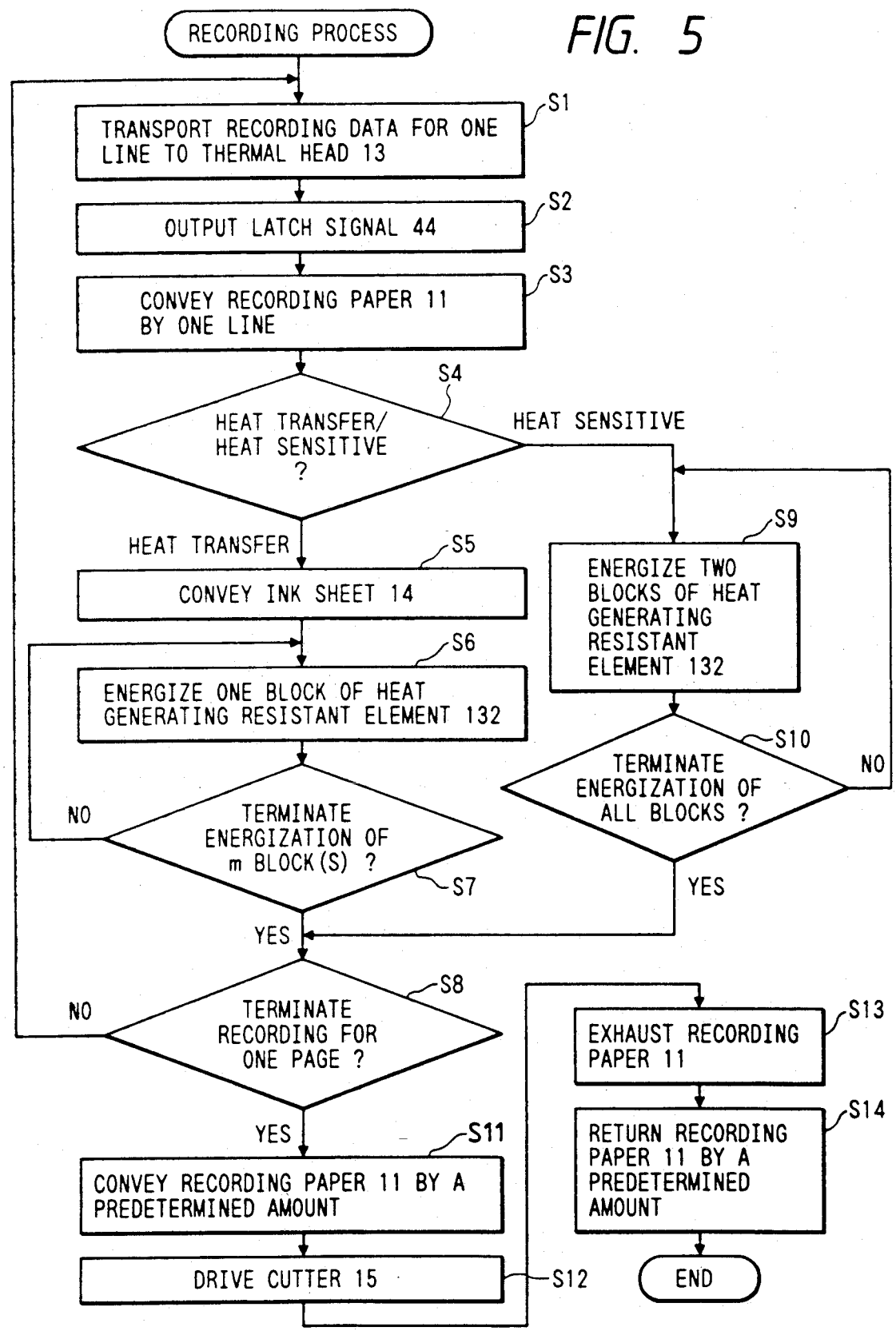
FIG. 5 is a flow chart showing a recording procedure in the facsimile system according to the embodiment of FIG. 1.

FIG. 5 shows a flow chart for performing the recording process for one page in the facsimile system according to the illustrated embodiment. The control program for executing this process is stored in the ROM 114 of the control unit 101.

The process is started from a condition that the image data for one line is stored in the line memory 110 and the recording operation can be initiated. First of all, in a step S1, the recording data for one line is serially transported to the shift register 130. After the recording data for one line has been transported to the thermal head 13, in a step S2, the latch signal is outputted, thus storing the recording data for one line in the latch circuit 131. Then, in a step S3, the recording paper 11 is conveyed or fed by one line. Incidentally, the length for this one line corresponds to a length of one dot recorded by the thermal head 13.

Next, the process goes to a step S4, where it is judged whether to perform heat-transfer image recording operation using the ink sheet 14 or the heat-sensitive image recording operation using the heat-sensitive paper, on the basis of the condition of the change-over switch 62 or on the basis of the detected result from the sensor 19 or 20. If the heat-transfer recording operation is desired, the process goes to a step S5, where the ink sheet feeding motor 25 is driven, thereby conveying the ink sheet 14 by a predetermined amount. Incidentally, if the fact that the multi-print ink sheet is mounted is indicated by the switch 103a and the like, the ink sheet 14 is fed, for example by $\frac{1}{3}$ of one line. On the other hand, if the normal one time ink sheet 14 is mounted, the ink sheet 14 is conveyed by one line as same as the recording paper. Next, in a step S6, one block of the heating elements, i.e., heat generating resistant elements 132 is energized to record the image. Next, in a step S7, it is judged whether the energization of all blocks (m blocks) of the thermal head 13 has been terminated and the recording operation for one line has been completed. In this way, in the steps S6 and S7, the image recording operation for one line is performed by heating and driving the thermal head 13 for one line.

After the image recording operation for one line has been terminated in the step S7, the process goes to a step S8, where it is judged whether the recording for one page has been terminated or not. If not, the process returns to the step S1, where the image data to be recorded on the next line is transported to the thermal head 13. Thereafter, the recording process for the next line is executed by the steps S2-S7.

If it is judged that the recording for one page has been terminated in the step S8, the process goes to a step S11, where the recording sheet 11 is conveyed or fed by a predetermined amount toward the ejector rollers 16a, 16b. Then, in a step S12, the cutter blades 15a, 15b are driven to engage each other, thus cutting the recording paper 11 into a page length. Next, in a step S13, the cut recording paper (on which the image has been recorded) is ejected from the facsimile system. Thereafter, in a step S14, the recording sheet feeding motor 24 is driven in the reverse direction, thereby returning the recording paper by a predetermined amount corresponding to a distance between the thermal head 13 and the cutter 15. In this way, the image recording operation for one page is ended.

On the other hand, in the step S4, if it is judged that the heat-sensitive recording operation is desired or indicated on the basis of the condition of the change-over switch 62 or the detected result from the sensor 19 or 20, the process goes to a step S9, where plurality of blocks (here, two blocks) of the thermal head 13 are simultaneously energized at appropriate energization power (energization time or energization voltage) suitable for the heat-sensitive paper. In the illustrated embodiment, in the step S9, two blocks are simultaneously energized. Next, in a step S10, all of the blocks of the thermal head 13 are energized, and it is judged whether the recording for one line is performed or not. In this way, the time required for recording on the heat-sensitive paper can be reduced by a half in comparison with the time required for the heat-transfer recording.

According to the illustrated embodiment, when the multi-print is effected by the use of the abovementioned multi-print ink sheet, in correspondence to the predetermined amount of feed of the recording paper, it is necessary to always feed the ink sheet by the predetermined distance. To this end, there is a relative movement between the thermal head and the recording paper (and the ink sheet), for example, in the case of the thermal printer of full-line type, whenever the recording for one line is completed, the ink sheet must be quickly separated from the recording paper. Now, according to the illustrated embodiment, in the recording operation for one line, by dividing the heating elements of the thermal head into a plurality of blocks (more than the number of blocks of a normal thermal head of full-line type), and by driving and heating each block successively, the number of the dots heated at a time is reduced, thus weakening the adhesion force between the recording paper and the ink sheet due to the fused ink, thereby permitting the quick separation between the ink sheet and the recording paper after the recording for one line has been terminated. Further, according to the illustrated embodiment, when the image is recorded on the heat-sensitive paper by means of the thermal head capable of performing the multi-print, it is possible to record the image by the lesser blocks (even if the number of dots in each block is increased), in consideration of the capacity of the power source for the thermal head. In this case, when the heat-sensitive paper is used, the recording time is reduced, thus taking an advantage due to the utilization of the heat-sensitive paper adequately.

Incidentally, in the illustrated embodiment, while an example that the blocks are energized independently was explained, the present invention is not limited to this example. For example, when the thermal head 13 is constituted by 1024 dots per line, as the number of dots which can be simultaneously energized (there are dots not energized on the basis of the image information), the thermal head may be energized in correspondence to the energization of 256 dots for each time in the heat-transfer recording operation, and may be energized in correspondence with the energizations of 341 dots by twice and 342 dots once in the heat-sensitive recording operation.

Figure 6:
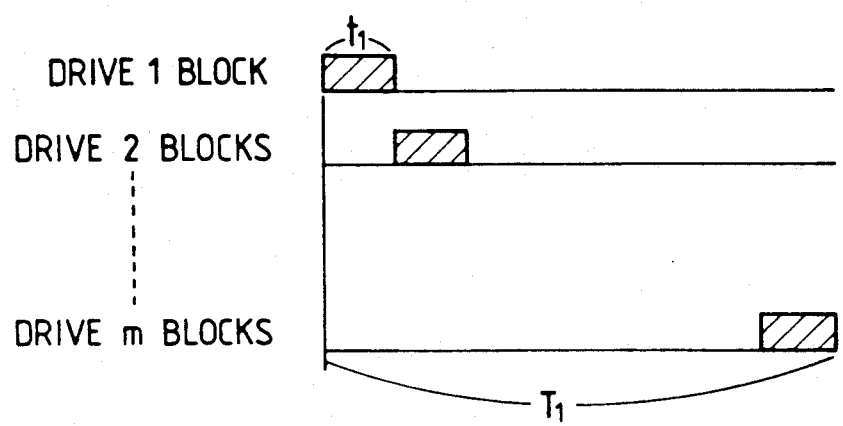
FIG. 6 is a timing chart showing current supply timings regarding a thermal head in a heat-transfer recording operation.

FIG. 6 shows a timing chart illustrating the energization timing of the thermal head 13 in the heat-transfer recording operation, where the energization time for driving one block is shown by $t_1$, and the energization time for driving m blocks is shown by $T_1$ ($\approx t_1 \times m$).

Figure 7:
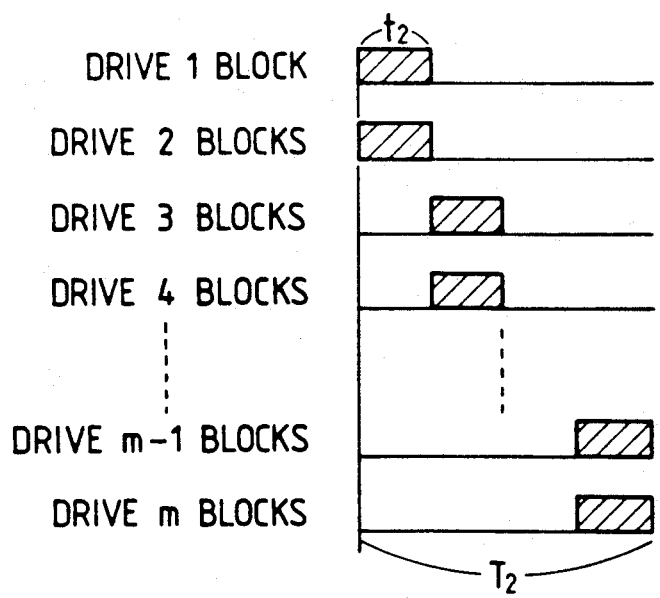
FIG. 7 is a timing chart showing current supply timings regarding a thermal head in a heat-sensitive recording operation.

On the other hand, FIG. 7 shows a timing chart illustrating the energization timing of the thermal head in the heat-sensitive recording operation.

Here, two blocks are simultaneously energized, and each energization time is shown by $t_2$. And, the time required for energizing all of m blocks is $T_2$ ($T_2 < T_1$).

Incidentally, in this embodiment, while the use of the thermal line head was explained, the present invention is not limited to such usage. For example, a so-called serial type thermal printer for performing the image recording by scanning a serial thermal head may be adopted.

Further, in the illustrated embodiment, while an example that the thermal printer is applied to the facsimile system was explained, the present invention is not limited to this example. For example, the thermal printer according to the present invention may be applied to a word processor, typewriter, copying machine or the like.

In addition, the recording medium used in the heat-transfer recording operation is not limited to recording paper, but may be other ink receptive material such as cloth, plastic sheet and the like. Further, the ink sheet is not limited to the sheet and roller shown in the illustrated embodiment, but, for example, may comprise a so-called ink sheet cassette which can removably mounted on the thermal printer and which includes an ink sheet housed in a housing of the cassette.

Further, the heating method is not limited to the above-mentioned method using the thermal head, but, for example, may be an energization method or laser transfer method.

Next, the ink sheet is fully explained with reference to FIG. 8.

Figure 8:
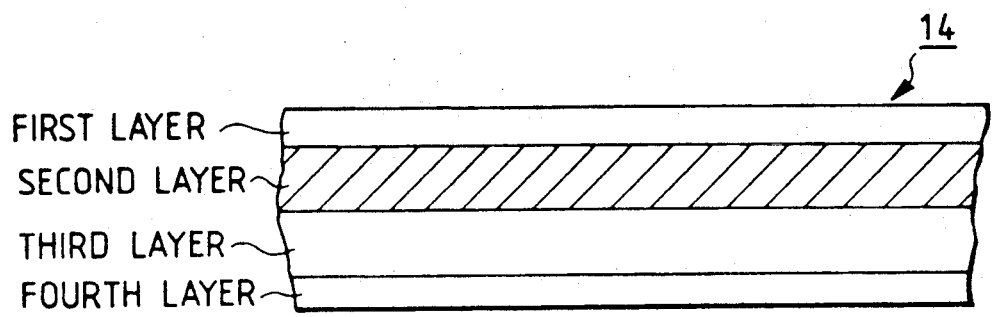
FIG. 8 is a sectional view of a multi-print ink sheet applicable to the embodiment of FIG. 1.

FIG. 8 is a sectional view of the multi-print ink sheet which, in this case, is constituted by four layers.

A second layer comprises a base film for acting as a support for the ink sheet 14. In the multi-print recording operation, since the ink sheet is subjected to thermal energy at the same portion by several times, the base film is preferably made of high heat-resistive aromatic polyamide film or condenser paper, but may be made of a conventional polyester film. Although it is advantageous, in obtaining good quality of the recorded image, that the thickness of the base film be made as thin as possible since it acts as the medium, the thickness of the base film is desirable to have a value of 3~8 μm in consideration of the strength of the ink sheet.

A third layer is an ink layer including an amount of ink permitting the recording of image on the recording paper by n times. The ink includes resin such as EVA as adhesive, carbon black or nigrosine dye for color, and carnauba wax or paraffin wax as binder, as main components. These components are blended so that they can be used by n times at the same position. Although it is preferable that an amount of ink applied to the ink sheet is 4~8 g/m², since the sensitivity and density of the recorded image are changed by the amount of ink, such amount of ink may be selected optionally.

A fourth layer is a top coating layer for preventing the transfer of the ink of the third layer onto a portion of the recording paper which is not desired to be recorded, which fourth layer is constituted by a transparent wax and the like. Accordingly, in the portion provided with the fourth layer, only the transparent fourth layer is in contact with the recording paper, thus preventing the smearing of the background of the recording paper. A first layer is a heat-resistive coating layer for protecting the second base film from the heat of the thermal head 13. This first layer is preferable for the multi-print recording operation which may apply the thermal energy for n lines to the same portion of the ink sheet (when the black image information is continuously inputted); however, this first layer may be used or not be used optionally. Further, this first layer is effective when a relatively low heat-resistive base film such as polyester film is used.

Incidentally, the construction of the ink sheet is not limited to the example shown in FIG. 8, but, for example, may comprise a base film and a porous ink holding layer arranged on one side of the base film, or may comprise ink housed in a heat resistive ink holding layer having a fine porous network structure arranged on the base film. Further, the base film may be made of, for example, polyamide, polyethylene, polyester, polyvinyl chloride, triacetyl cellulose, nylon, or cloth. Further, the heat-resistive first layer is not necessarily be provided, but, if it is provided, it may be made of silicone resin, epoxy resin, fluororesin or ethoro-cellulose.

Further, as an example of the ink sheet having heat-sublimable ink, there is an ink sheet comprising a base film made of polyethylene terephthalate, polyethlene naphthalate, or aromatic polyamide film, and a color layer including spacer particles and dye formed by guanamine resin and fluororesin.

Next, the principle of the recording will be explained with reference to FIG. 9.

Figure 9:
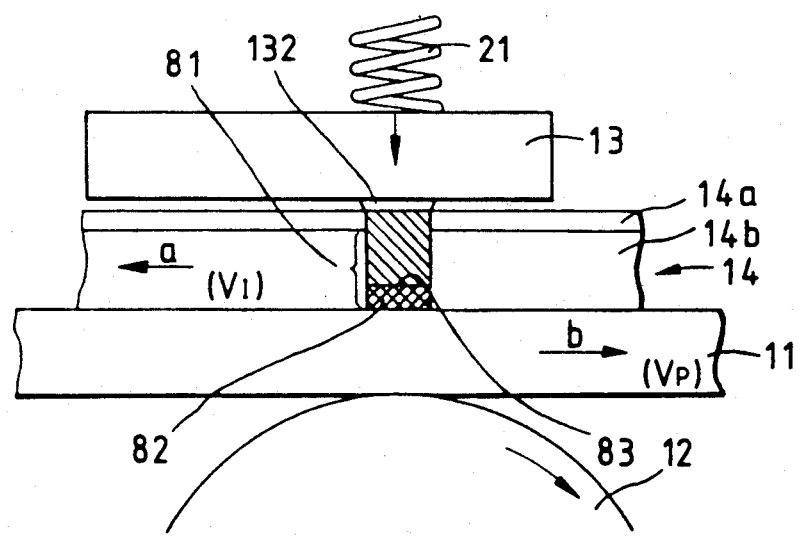
FIG. 9 is an view explaining a principle of the recording in the facsimile system according to the embodiment of FIG. 1.

FIG. 9 shows a condition that the image recording is effected while shifting the recording paper 11 in the direction opposite to the shifting direction of the ink sheet 14, according to the illustrated embodiment.

As shown in FIG. 9, the recording paper 11 and the ink sheet 14 are positioned between the platen roller 12 and the thermal head 13. The thermal head 13 is urged against the platen roller 12 at a predetermined pressure by means of a spring 21. The recording paper 11 is conveyed or fed at the speed VP in the direction b through the rotation of the platen roller 12. On the other hand, the ink sheet 14 is fed at the speed VI in the direction a through the rotation of the ink sheet feeding motor 25. Incidentally, the ink sheet 14 can be stopped.

Now, when the heating elements 132 of the thermal head 13 are energized by the power source 105 and are heated, a hatched portion 81 of the ink sheet 14 is also heated. Incidentally, the reference numeral 14a designates the aforementioned base film (second layer) of the ink sheet 14, and 14b designates the aforementioned ink layer (third layer). The ink in the ink layer 81 heated by energizing the heating elements 132 becomes molten, and a portion 82 of the ink layer 81 is transferred onto the recording paper 11. The ink portion 82 transferred to the recording paper corresponds to substantially 1/n of the total ink layer 81.

During the transferring operation, it is necessary to transfer only the ink portion 82 to the recording paper 11 by shearing the ink layer 14b along a boundary 83 by means of a shearing force acting on the ink. However, such shearing force varies in accordance with the temperature of the ink so that the shearing force tends to decrease as the temperature of the ink is increased. Accordingly, since the shearing force is increased by shortening the heating time of the ink sheet 14, if the relative velocity between the ink sheet 14 and the recording paper 11 is increased, the ink portion (82) to be transferred can positively separated from the ink sheet 14.

According to the illustrated embodiment, since the heating time of the thermal head 13 in the facsimile system is relatively short on the order of about 0.6 ms, by opposing the feeding direction of the recording paper 11 to the feeding direction of the ink sheet 14, the relative speed between the ink sheet 14 and the recording paper 11 is increased. Incidentally, while an example that the ink sheet 14 is shifted in the direction opposite to the feeding direction of the recording paper 11 was given, the present invention is not limited to this example. For example, the feeding direction of the ink sheet may be the same as that of the recording paper.

As mentioned above, according to the illustrated embodiment, not only heat-transfer recording including multi-print recording but also heat-sensitive recording can be performed, and, in the heat-sensitive recording operation, by increasing the number of dots of the thermal head to be simultaneously heated, it is possible to shorten the recording time in the heat-sensitive recording operation.

As mentioned above, according to the present invention, by altering or changing the number of dots of the thermal head to be heated between the heat-sensitive recording operation and the heat-transfer recording operation, it is possible to perform both the heat-sensitive recording and the heat-transfer recording, and the recording time can be shortened when using the heat-sensitive recording medium.

What is claimed is:

1. A thermal printer which can perform both a heat-sensitive recording operation and a heat-transfer recording operation, comprising:
   a recording medium loading portion for removably receiving a recording medium for said heat-sensitive recording operation and a recording medium for said heat-transfer recording operation;
   an ink sheet loading portion for removably receiving an ink sheet used with said heat-transfer recording operation;
   recording means for recording an image on said recording medium, said recording means having a plurality of dots; and
   control means for energizing said recording means to heat a predetermined number of said dots when the image is recorded on said recording medium for said heat-transfer recording operation by means of said recording means and for energizing said recording means to heat a number of said dots larger than said predetermined number of dots when the image is recorded on said recording medium for said heat-sensitive recording operation.

2. A thermal printer according to claim 1, wherein said control means judges whether said heat-transfer recording operation or said heat-sensitive recording operation should be performed on a basis on a condition of a manual change-over switch.

3. A thermal printer according to claim 1, wherein said control means judges that said heat-transfer recording operation should be performed when said ink sheet is received in said ink sheet loading portion.

4. A thermal printer according to claim 1, wherein, when the image is recorded on said recording medium for said heat-transfer recording operation, said control means energizes said recording means to heat a block of dots, a number of blocks for said heat transfer recording operating being larger than a number of blocks for said heat-sensitive recording operation.

5. A thermal printer according to claim 1, wherein said ink sheet is a multi-print ink sheet.

6. A thermal printer wherein an image is recorded on a heat-sensitive recording medium by applying heat to said heat-sensitive recording medium by means of a thermal head or an image is recorded on a recording medium by transferring ink included in an ink sheet, comprising:
   indicating means for indicating an image recording either on said heat-sensitive recording medium or said recording medium;
   recording means for performing said image recording on said heat-sensitive recording medium and said recording medium; and
   control means for energizing said recording means to heat a predetermined number of dots thereby recording the image on said recording medium when the image recording on said recording medium is indicated by means of said indicating means and for energizing said recording means to heat a number of dots larger than said predetermined number of dots thereby recording the image on said heat-sensitive recording medium when the image recording on said heat-sensitive recording medium is indicated by means of said indicating means.

7. A thermal printer according to claim 6, wherein said indicating means further comprises a detecting means for detecting a presence of said ink sheet, whereby said indicating means indicates the image recording is to be performed on said heat-sensitive recording medium when said ink sheet is not detected.

8. A thermal printer according to claim 6, wherein said indicating means comprises a manually operated switch.

* * * * *

UNITED STATES PATENT AND TRADEMARK OFFICE
CERTIFICATE OF CORRECTION

PATENT NO. : 5,115,255

DATED : May 19, 1992

INVENTOR(S) : MAKOTO KOBAYASHI, ET AL.

It is certified that error appears in the above-identified patent and that said Letters Patent is hereby corrected as shown below:

On the Title page, item [30] FOREIGN APPLICATION PRIORITY DATA

Insert: --Oct. 9, 1989 [JP] Japan ........ 1-262184--.

COLUMN 1

Line 51, "multi-print, recording" should read --multi-print recording,--.

COLUMN 2

Line 5, "tion/using" should read --tion using--.
Line 39, "an" should read --a--.
Line 49, "head," should read --head--.

COLUMN 4

Line 7, "with" (first occurrence) should read --in--.

COLUMN 8

Line 7, "abovementioned" should read --above-mentioned--.
Line 60, "$T_2(T_2<T_1)$." should read --$T_2(T_2<T_1)$.--.

COLUMN 9

Line 12, "can" should read --can be--.

COLUMN 10

Line 53, "can" should read --can be--.

UNITED STATES PATENT AND TRADEMARK OFFICE
CERTIFICATE OF CORRECTION

PATENT NO. : 5,115,255
DATED : May 19, 1992
INVENTOR(S) : MAKOTO KOBAYASHI, ET AL.

It is certified that error appears in the above-identified patent and that said Letters Patent is hereby corrected as shown below:

<u>COLUMN 12</u>

Line 8, "operating" should read --operation--.

Signed and Sealed this

Nineteenth Day of October, 1993

Attest:

BRUCE LEHMAN

*Attesting Officer*   Commissioner of Patents and Trademarks